(12) United States Patent
Ni et al.

(10) Patent No.: US 11,833,666 B2
(45) Date of Patent: Dec. 5, 2023

(54) METHOD FOR ASSEMBLING AN OPERATING MEMBER AND AN ADAPTING MEMBER BY A ROBOT, ROBOT, AND CONTROLLER

(71) Applicants: SHANGHAI FLEXIV ROBOTICS TECHNOLOGY CO., LTD., Shanghai (CN); FLEXIV LTD., Grand Cayman (GB)

(72) Inventors: Feijian Ni, Shanghai (CN); Shuyun Chung, Santa Clara, CA (US)

(73) Assignees: SHANGHAI FLEXIV ROBOTICS TECHNOLOGY CO., LTD., Shanghai (CN); FLEXIV LTD., Grand Cayman (GB)

(*) Notice: Subject to any disclaimer, the term of this patent is extended or adjusted under 35 U.S.C. 154(b) by 148 days.

(21) Appl. No.: 17/600,234

(22) PCT Filed: Oct. 28, 2020

(86) PCT No.: PCT/CN2020/124192
§ 371 (c)(1),
(2) Date: Sep. 30, 2021

(87) PCT Pub. No.: WO2022/087859
PCT Pub. Date: May 5, 2022

(65) Prior Publication Data
US 2022/0297310 A1    Sep. 22, 2022

(51) Int. Cl.
*B25J 9/16* (2006.01)
*B25J 13/08* (2006.01)
*B23P 19/04* (2006.01)

(52) U.S. Cl.
CPC ............. *B25J 13/085* (2013.01); *B23P 19/04* (2013.01); *B25J 9/1633* (2013.01); *B25J 9/1697* (2013.01)

(58) Field of Classification Search
CPC ...... B25J 13/085; B25J 9/1633; B25J 9/1697; B25J 9/1687; B23P 19/04; B23P 19/10; G05B 2219/40033
(Continued)

(56) References Cited

U.S. PATENT DOCUMENTS

| 4,116,375 A * | 9/1978 | Mozzhukhin ......... B23K 13/00 |
| | | 118/620 |
| 5,220,718 A * | 6/1993 | Speller, Sr. ............ B25J 15/103 |
| | | 29/430 |

(Continued)

FOREIGN PATENT DOCUMENTS

| CN | 102218652 A | 10/2011 |
| CN | 103507071 A | 1/2014 |

(Continued)

OTHER PUBLICATIONS

Office Action for Chinese Patent Application No. 20201170705.X dated Apr. 24, 2022.
(Continued)

*Primary Examiner* — Jaime Figueroa
(74) *Attorney, Agent, or Firm* — Dorsey & Whitney LLP (57) ABSTRACT

A method for assembling an operating member and an adapting member by a robot is provided. According to the method, the operating member is moved to the adapting member in an assembly direction until the operating member reaches the adapting member. A moving mode for adjusting the operating member is determined, in which the moving mode includes one or both of a moving-in-plane mode and a posture-adjusting mode. The operating member is moved in the determined moving mode and applied a force continuously in the assembly direction during movement. It is determined whether a preset condition for a completion of the assembling of the operating member and the adapting member is satisfied. And the movement of the operating (Continued)

member in the determined moving mode is stopped or the applied force is stopped when it is determined that the preset condition is satisfied.

14 Claims, 7 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 11,027,424 B2* | 6/2021 | Umeyama | ................ | B25J 15/10 |
| 11,141,855 B2* | 10/2021 | Ishikawa | ................ | B25J 19/021 |
| 11,173,613 B2* | 11/2021 | Mariyama | ................ | B25J 19/023 |
| 11,300,990 B2* | 4/2022 | Battlogg | ................ | G05G 9/047 |
| 11,312,021 B2* | 4/2022 | Sejimo | ................ | B25J 13/085 |
| 11,318,609 B2* | 5/2022 | Takeuchi | ................ | B25J 13/085 |
| 11,426,874 B2* | 8/2022 | Chung | ................ | B25J 9/1687 |
| 2004/0237331 A1* | 12/2004 | Sarfaty | ................ | B24B 19/226 |
| | | | | 34/218 |
| 2008/0209650 A1* | 9/2008 | Brewer | ................ | A61C 17/221 |
| | | | | 433/119 |
| 2008/0312769 A1* | 12/2008 | Sato | ................ | B25J 9/1687 |
| | | | | 901/31 |
| 2012/0130541 A1* | 5/2012 | Szalek | ................ | B25J 9/106 |
| | | | | 901/4 |
| 2013/0111731 A1 | 5/2013 | Onishi | | |
| 2018/0021949 A1* | 1/2018 | Miura | ................ | B25J 9/1638 |
| | | | | 700/250 |
| 2018/0029234 A1* | 2/2018 | Ueda | ................ | B25J 9/1633 |
| 2019/0184564 A1* | 6/2019 | Muraoka | ................ | B25J 9/1633 |
| 2019/0270207 A1* | 9/2019 | Motowaki | ................ | B25J 9/1664 |
| 2019/0381669 A1* | 12/2019 | Ogawara | ................ | B25J 9/1633 |
| 2020/0023521 A1* | 1/2020 | Dan | ................ | B25J 9/1692 |
| 2020/0272193 A1* | 8/2020 | Battlogg | ................ | G05G 5/03 |
| 2022/0226995 A1* | 7/2022 | Beck | ................ | B25J 11/0055 |

FOREIGN PATENT DOCUMENTS

| | | |
|---|---|---|
| CN | 104057290 A | 9/2014 |
| CN | 104625676 A | 5/2015 |
| CN | 106272416 A | 1/2017 |
| CN | 106584093 A | 4/2017 |
| CN | 109382828 A | 2/2019 |
| CN | 110076780 A | 8/2019 |
| CN | 110449882 A | 11/2019 |
| CN | 111752231 A | 10/2020 |
| JP | H08112729 A | 5/1996 |
| JP | 2010137299 A | 6/2010 |
| JP | 2012125852 A | 7/2012 |
| KR | 20190000430 A | 1/2019 |

OTHER PUBLICATIONS

International Search Report and Written Opinion from International Application No. PCT/CN2020/124192 dated Jul. 27, 2021.
Second Office Action for Chinese Application No. 20201170705.X dated Dec. 30, 2021.

* cited by examiner

METHOD FOR ASSEMBLING AN OPERATING MEMBER AND AN ADAPTING MEMBER BY A ROBOT, ROBOT, AND CONTROLLER

TECHNICAL FIELD

The present disclosure relates to the field of industrial robots, and particularly relates to a method for assembling an operating member and an adapting member by a robot, a robot, and a controller.

BACKGROUND

Currently, position-based control is mainly adopted in industrial robots for objects assembling. However, there are some application scenarios in which position-based control is not achievable since it is possible that relative locations and postures of the objects to be assembled are not consistent and locations and/or postures errors may exist. The existence of such errors may cause that the robot fails to complete the whole assembling process, and thus the errors have to be corrected manually in this circumstance. For example, in industrial production, the assembling of various plugs and sockets often relies on manual operation.

Therefore, it is necessary to further improve the automation degree of robot assembling, so as to release operating members from more operation lines.

SUMMARY

The present disclosure intends to propose a method for assembling an operating member and an adapting member by a robot. According to an aspect of the present disclosure, the method includes: moving the operating member towards the adapting member in an assembly direction until the operating member reaches the adapting member, wherein the assembly direction is a direction which allows the operating member and the adapting member to be engaged; determining a moving mode for adjusting the operating member, the moving mode comprising one or both of a moving-in-plane mode, in which the operating member is moved in a plane perpendicular to the assembly direction, and a posture-adjusting mode, in which the operating member is adjusted around the assembly direction; moving the operating member in the determined moving mode, and applying a force continuously to the operating member in the assembly direction during moving the operating member in the determined moving mode; and determining whether a preset condition for a completion of the assembling of the operating member and the adapting member is satisfied, and stopping moving the operating member in the determined moving mode as well as stopping applying the force to the operating member in the assembly direction when it is determined that the preset condition is satisfied.

According to the other aspect of the present disclosure, a robot is provided. The robot includes several connecting rods; joint drivers provided at connections of the connecting rods; an end effector provided at the end of the connecting rods; and an operating tool provided at the end effector. The operating tool is configured to move an operating member to an adapting member in an assembly direction until the operating member reaches the adapting member, where the assembly direction is the direction which allows the operating member and the adapting member to be engaged; move the operating member in a determined moving mode, where a force is continuously applied to the operating member in the assembly direction during moving the operating member in the determined moving mode; and stop moving the operating member in the determined moving mode and stop applying the force to the operating member in the assembly direction, if a preset condition for a completion of the assembling of the operating member and the adapting member is satisfied.

According to another aspect of the present disclosure, a controller is provided. The controller includes a processor and a memory used for storing instructions. When executing the instructions, the processor is configured to control a robot to move an operating member to an adapting member in an assembly direction until the operating member reaches the adapting member, where the assembly direction is a direction which allows the operating member and the adapting member to be engaged; determine a moving mode for adjusting the operating member, where the moving mode includes one or both of a moving-in-plane mode and a posture-adjusting mode; control the robot to move the operating member in the determined moving mode, where the robot is controlled to apply a force to the operating member in the assembly direction during moving the operating member in the determined moving mode; and determine whether a preset condition for a completion of the assembling of the operating member and the adapting member is satisfied, and when it is determined that the the preset condition is satisfied, stop moving the operating member in the determined moving mode and stop applying the force to the operating member in the assembly direction. In the moving-in-plane mode, the operating member is moved in a plane perpendicular to the assembly direction, and in the posture-adjusting mode, the operating member is adjusted around the assembly direction.

BRIEF DESCRIPTION OF THE DRAWINGS

In order to clearly explain the technical solutions according to embodiments of the present disclosure, the accompanying drawings used in describing the embodiments will be briefly described below. The drawings in the following description are merely exemplary embodiments of the present invention. For those of ordinary skill in the art, other embodiments can be derived based on these drawings without any creative work.

FIG. 6A and FIG. 6B schematically show exemplary scenarios where an operating member 70 (a voice coil) needs to be fit into an adapting member 72 (a voice device), in which

DETAILED DESCRIPTION

The present invention will now be described in detail with reference to the drawings and examples. The described embodiments are merely exemplary and represent a subset of embodiments of the present disclosure. Those skilled in the art can obtain additional embodiments based on the embodiments of the present disclosure without creative efforts, and all these embodiments fall within the scope of the present disclosure.

Figure 1:
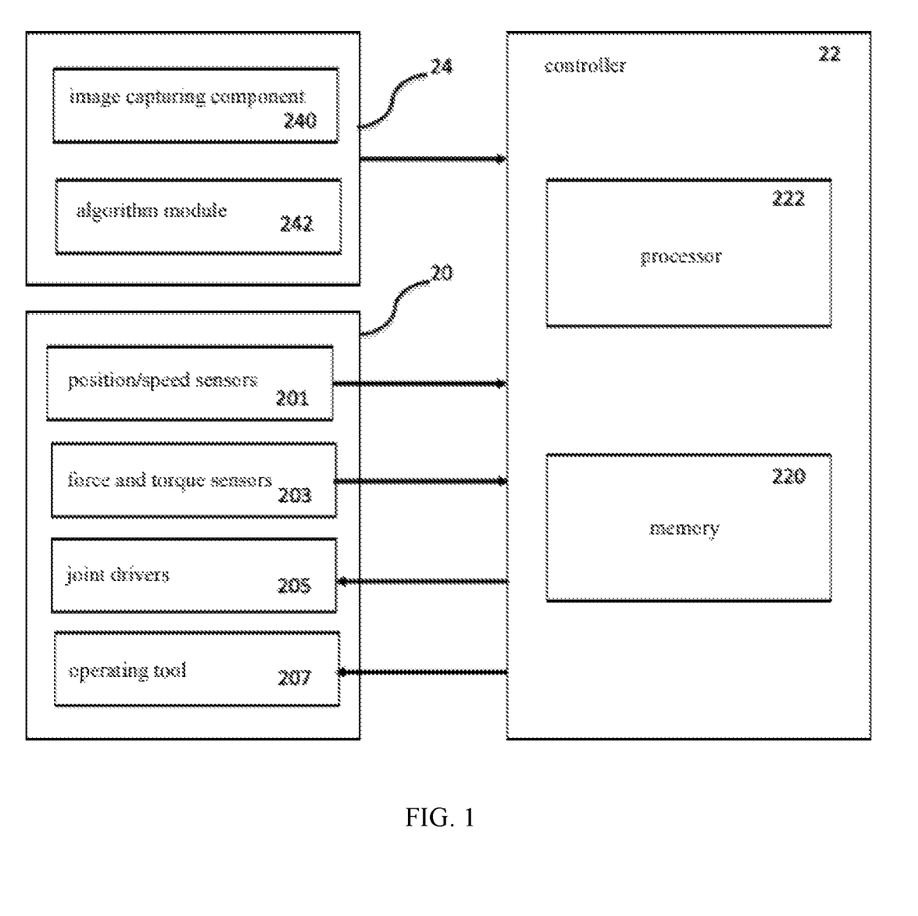
FIG. 1 is a block diagram of a robot according to an example of the present disclosure.
Figure 2:
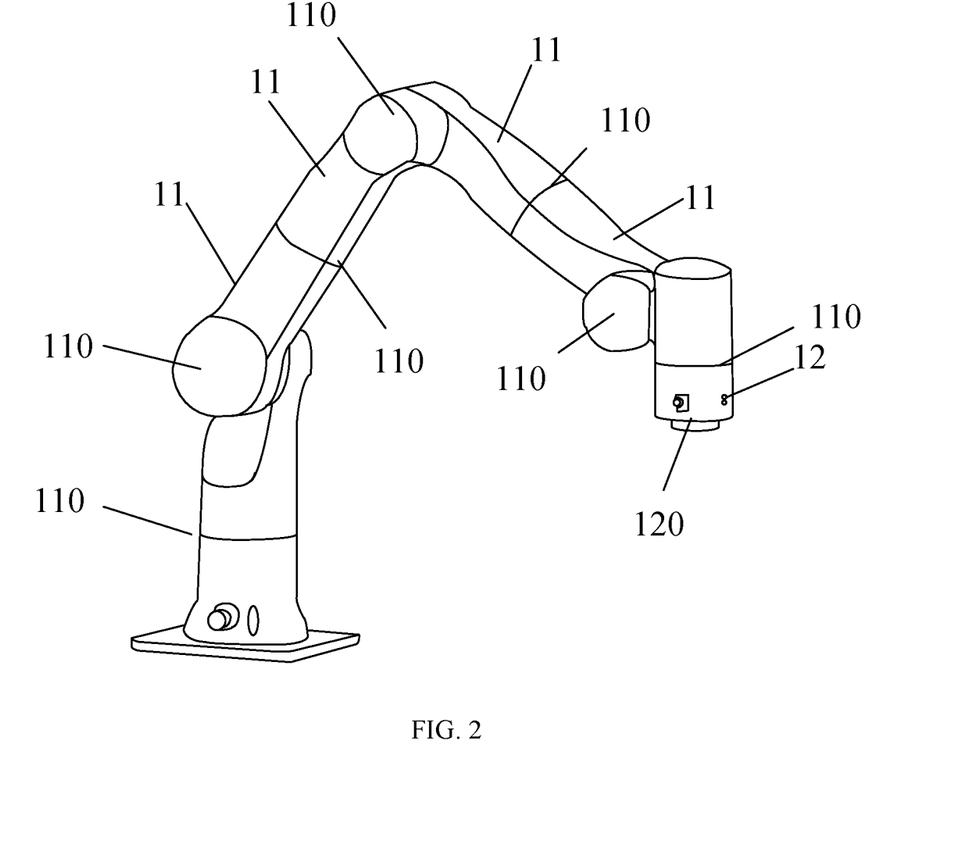
FIG. 2 is a schematic illustration of a robot body according to an example of the present disclosure.

FIG. 1 is a block diagram of a robot according to an example of the present disclosure. FIG. 2 is a schematic illustration of a robot body according to an example of the present disclosure, which is also called a robot arm in some cases. In various examples of the present disclosure, an operating member and an adapting member refer to two workpieces to be assembled together, where one of the workpieces operated by, for example, an operating tool provided at the end of the robot is called an operating member, and the other of the workpieces which is adapted to fit the operating member is an adapting member. In some instances, the adapting member may further include an adapting part to be combined with the operating member. In other instances, the operating member may include an operating part specifically for matching the adapting member.

As shown in FIG. 1, the robot includes a robot body 20, a controller 22 and a vision system 24. As shown in FIG. 2, the robot body 20 may include several connecting rods 11 and end effector 12 disposed at the end of the links. For example, the end effector 12 can be equipped with an operating tool (not shown) through the end flange 120 to operate the operating member. In one embodiment, the operating tool is, for example, a clamping member for clamping a workpiece to be operated. In another embodiment, the operating tool can be a component for holding, a workpiece to be operated. In yet another embodiment, the operating tool is a vacuum suction head. The operating tool can be any various took which can be used to operate the workpiece to be operated, and are not limited to the tools listed here. In the robot body 20, the connection part between two adjacent connecting rods 11 is also called a joint 110.

Referring to FIGS. 1 and 2, in some embodiments, the robot body 20 includes position/speed sensors 201, force and torque sensors 203, joint drivers 205, and an operating tool 207. The operating tool 207 may be disposed on an end effector 12 (see FIG. 2). Position/speed sensors 201 are distributed at each joint 110 of the robot body 20 to sense the position of the respective joint. As an example, the force and torque sensors 203 are also distributed at each joint 110 of the robot body 20 to determine the joint torque of the robot. The force and torque sensor 203 may be a single-degree of freedom force or torque sensor or a multi-degree of freedom (e.g., six-degree of freedom) force and torque sensor. In other embodiments, joint torque can alternatively be obtained from the joint current feedback value and the observation of the joint observer rather than the force and torque sensors 203. Further, the contact force and torque at the end of the end effector can be calculated from the joint torque. The joint drivers 205 are provided at the joints 110 of the robot body 20, respectively, to drive the movement of the respective connecting rods of the robot. An operating tool 207 is provided at the end effector 12 shown in FIG. 2 for operating the operating member. The operating tool 207 can be of different forms. In the present disclosure, the operating tool 207 is configured to move the operating member to the adapting member in the assembly direction until the operating member reaches the adapting member. Herein, the assembly direction refers to the direction in which the operating member and the adapting member are engaged. For example, in FIG. 4, the assembly direction is the direction in which the operating member 40 enters into and moves to the adapting part 420 of the adapting member 42, that is, the negative z direction.

The operating tool 207 is also configured to move the operating member in a determined moving mode, and continuously apply a force in the assembly direction to the operating member during the movement of the operating member in the determined moving mode, such that the operating member and the adapting member are in a stable contact during the whole assembling process. In the present disclosure, the force applied to the operating member in order that the operating member and the adapting member have a stable contact during the whole assembling process is also referred to as a contact force. The magnitude of the contact force is not necessarily constant. For example, the force can be a constant force, a gradually increasing force, or a gradually decreasing force. In some embodiments, the magnitude of the contact force can be determined based on the assembling scenario of the operating member and the adapting member, and the material properties of the both. For example, if both the operating member and the adapting member are made of hard materials, a constant force can be applied; and if any one of the operating member and the adapting member is made of soft material, it is possible to apply a force that gradually increases or decreases or changes in magnitude.

The operating tool 207 is further configured to stop moving the operating member in the determined moving mode and stop applying the force to the operating member in the assembly direction if a preset condition indicating that the assembling of the operating member and the adapting member is completed is met. According to the example of the application, the preset condition may be that the assembling time is greater than a preset maximum assembling time. The assembling time refers to a period starting from the moment of the operating member reaching the adapting member to the completion of the engagement of the operating member with the adapting member. The preset condition may also be the depth of moving the operating member from the position at which the operating member reaches the adapting member into the adapting member is greater than the preset assembling depth. In other embodiments, other conditions which can be used to indicate the completion of the assembling can be taken as the aforesaid preset condition.

Referring to FIG. 1, the controller 22 includes a processor 222 and a memory 220. The memory 220 is used to store data which, for example, includes instructions to be executed by the processor 222 to control the robot body 20, data transmitted by the vision system 24, and data transmitted by various devices which are provided on the robot body 20 such as position/speed sensors, force and torque sensor or the like. In some examples, the memory 220 may also store, for example, multiple preset possible moving modes for adjusting the operating member. And, in some cases, the memory 220 may store a preset track. The processor 222 is configured to execute instructions stored in the memory 220. The processor 222 can also process various data input into the controller 22, which may or may not be data in the memory 220.

According to some examples of the present disclosure, the processor 222 is configured to generate a control signal for controlling the operating tool 207 of the robot body 20 so as to move the operating member to the adapting member in the assembly direction until the operating member reaches the adapting member. For example, the processor 222 determines the scenario of the assembling according to the image acquired by the vision system 24 of the robot, then determines to move the operating member to the adapting member by operations such as grasping and moving until the operating member reaches the adapting member, and then generates a control signal for the operation tool 207 accordingly.

According to further examples of the present disclosure, the processor 222 is configured to determine the moving mode for adjusting the operating member when executing instructions stored in the memory 220. In other words, for the operating member which already reaches the adapting member, the processor 222 is configured to determine which moving mode(s) is used to engage the operating member with the adapting member to complete the assembly. The moving mode includes one or both of a moving-in-plane mode and posture-adjusting mode. In the moving-in-plane mode, the operating member is moved in a plane perpendicular to the assembly direction. In the posture-adjusting mode, the operating member is adjusted around the assembly direction. The processor 222 further generates the control signal from the determined moving mode to enable the operating tool 207 to move the operating member in the determined moving mode. In the process of moving the operating member in the determined moving mode, the processor 222 can adjust the magnitude of the contact force according to the data sensed by the sensors disposed on the robot body 20, such as the force and torque sensors 203. For the adjustment of the contact force, it is also possible for the processor 222 to refer to the image information of the operating member and the adapting member collected, for example, by the vision system 24.

As an example, the processor 222 can determine the assembly environment from the images of the operating member, the adapting member and their surrounding environment by the vision system 24. The assembly environment is related to the positions of the operating member and the adapting member or/and related to the way for assembling of the operating member and the adapting member. Alternatively, the determination of the assembly environment is unnecessarily determined by the processor 222. For example, if the vision system 24 includes an algorithm module, the algorithm module may determine the assembly environment and transmit the determined assembly environment to the processor 222 of the controller 22. According to the assembly environment, the processor 222 determines the moving mode for adjusting the operating member.

Referring to FIG. 1, the vision system 24 of the shown robot includes an image capturing component 240 and an algorithm module 242. The image capturing component 240 is used for taking images of the operating member and the adapting member, and, if necessary, can also be configured to take images when the operating member is moved in the moving mode. As an example, the image capturing component 240 can be a camera or an image sensing unit. The algorithm module 242 may be configured to calculate and determine the position of the operating member, the position of the adapting member and their relative position from images taken by the image capturing component 240. Other functions can be configured for the algorithm module 242, such as processing the captured image when the operating member moves in the moving mode. It should be noted that the algorithm module 242 of the vision system 24 is optional. Image data for the image captured by the image capturing component 240 can be transmitted to the controller 22 for processing. In addition, according to other examples of the application, the vision system 24 may be omitted. For example, if the moving mode in which the operating member moves to the adapting member is a preset moving mode, then the vision system 24 can be omitted since it may be unnecessary to determine the assembly environment.

In some examples, when executing the instructions stored in the memory 220, the processor 222 determines the moving mode for adjusting the operating member by selecting the mode from multiple possible preset moving modes. That is, in those examples, the moving mode used for adjusting the operating member can be directly selected from the multiple possible moving modes stored in advance, rather than be determined by the processor 222 based on the images taken by the vision system or data sensed by other sensors.

In some examples, the processor 222 controls the operating tool 207 via the control signal to move the operating member according to one of the following preset tracks or a combination of two or more of the following preset tracks: a track of one way or back and forth movement along a straight line; a track of one way or back and forth movement along a curve; a track of one way or back and forth movement in a grid path; and a track of one way or back and forth movement spirally, where the one way or back and forth movement spirally means moving circularly with gradually increasing radius.

In addition, according to an example of the present disclosure, the vision system 24, especially the image capturing component 240 of the vision system 24, can be configured to capture images of the operating member and the adapting member during the movement of the operating member in the determined moving mode, thereby generating position information of the operating member and the adapting member and posture information of at least the operating member. On one hand, in the process of moving the operating member, the processor 222 can adjust the moving mode and moving path according to the information received from the vision system 24, so as to bypass obstacles. Accordingly, flexible assembly suitable for the actual assembly scenario can be achieved. On the other hand, the processor 222 is configured to optimize the moving mode according to the position information of the operating member and the adapting member and posture information of at least the operating member, which is helpful to improve the moving mode. In other embodiments, it is also possible to realize flexible assembly and optimizing by the information sensed by the robot, such as position sensors, force and torque sensors.

Figure 4:
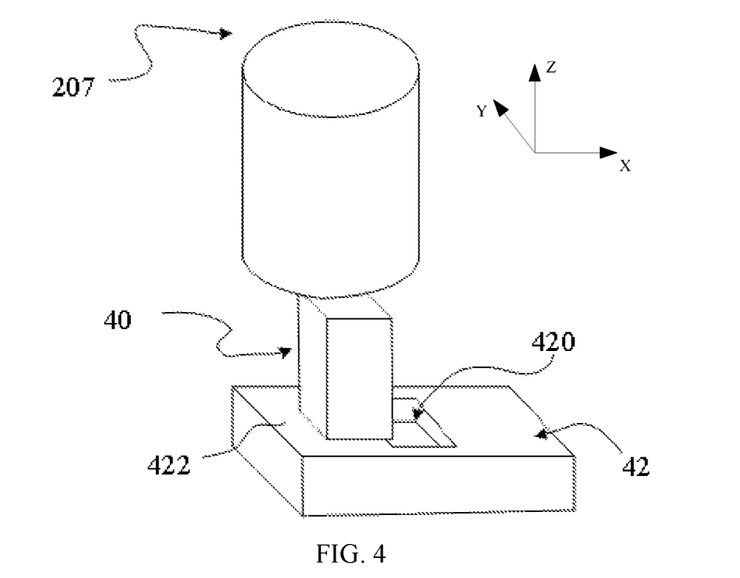
FIG. 4 schematically shows an assembling scenario of an operating member and an adapting member according to an example of the present disclosure.

FIG. 4 schematically shows an assembling scenario of an operating member and an adapting member according to an example of the present disclosure. Referring to FIG. 1, FIG. 2 and FIG. 4, the operating tool 207 provided at the end effector 12 has moved the operating member 40 onto the plane 422 of the adapting member 42. The processor 222 of the controller 20 determines the moving mode for adjusting the operating member 40 so as to assemble the operating member 40 into the adapting part 420 of the adapting member 42. The processor 222 of the controller 20 determines whether to use a moving-in-plane mode, a posture-adjusting mode, or a combination thereof, for example, according to the information transmitted by the vision system 24. In the particular example, based on the information from the vision system 24, the processor 222 determines that it may use the moving-in-plane mode.

More specifically, the processor 222 determines from the image captured by the image capturing part 240 of the vision system 24 that the operating member 40 can enter into the adapting part 420 of the adapting member 42 along the linear and unidirectional moving track and accordingly generates a control signal for the operating tool 207. After receiving the control signal, the operating tool 207 moves the operating member 40 into the adapting part 420 according to the linear and unidirectional moving track. In the event that the operating tool 207 encounters obstacles in moving the operating member 40, the processor 222 can further adjust the moving mode according to images or the data transmitted by the sensor in accordance with the present disclosure. For example, the processor 222 determines that the posture-adjusting mode should be used to adjust the posture of the operating member 40, or the processor 222 determines that the moving track should be adjusted to the track of moving in a grid path in the moving-in-plane mode.

As mentioned above, when the operating tool 207 moves the operating member 40 towards the adapting part 420 in the plane 422 perpendicular to the assembly direction, a force, referred to as a contact force, is applied to the operating member 40 continuously to make the operating member 40 reach the plane 422. The contact force is not fixed, but is changeable depending on materials of the operating member 40 and the adapting member. In some examples, the force applied to the operating member can be constant. In other examples, the force applied to the operating member can be inconstant, such as a first force which is increased gradually, a second force which is decreased gradually, or the like.

The force applied by the operating tool 207 to keep the operating member 40 in contact with the plane 422 is intended to press the operating member towards the plane 422. The applied force can remain constant, or change from large to small, from small to large, or from time to time. No matter how the force is applied herein, it is necessary to keep the operating member in stable contact with the plane perpendicular to the assembly direction.

According to the examples of the present disclosure, the contact between the operating member and the plane perpendicular to the assembly direction can be point contact, surface contact, arc contact, etc., which depends on the shape of the part of the operating member used to contact the plane.

In the example shown in FIG. 4, the force applied by the operating tool 207 to the operating member 40 is a constant force. According to some examples of the present disclosure, a preset condition for determining whether to stop moving the operating member 40 in assembling the the operating member 40 and the adapting member 42 is set in advance. When the processor 222 determines that the preset condition is satisfied, it generates a control signal to stop the operating tool 207 moving the operating member 40. As an example, the preset condition can be that the time spent in assembling is greater than the preset maximum assembling time in which the assembling time can be counted from the moment that the operating member reaches the adapting member. Once the preset condition is satisfied, the operating tool 207 is controlled to stop moving the operating member 40 and stop applying force to the operating member 40. According to other examples, the preset condition can be that the depth of movement of the operating member to the adapting member is greater than the preset assembling depth after the operating member reaches the adapting member. In all examples herein, when we discuss A is greater B, A equaling B is also included.

The preset conditions will be further exemplified with reference to FIG. 4 hereinafter. It should be noted that the preset condition can be selected according to the actual needs, such as selecting one or more from the conditions set in advance.

As shown in FIG. 4, the engagement of the operating member 40 with the adapting member 42 is that the operating member 40 falls into the adapting member 420 so as to fit each other. Different ways can be used to determine the just reaching of the operating member 40 and the adapting member 42. For example, the force and torque sensors provided on the robot detect that the operating member 40 receives a resistance from the plane 422, thereby it can be determined that the operating member 40 starts to contact the adapting member 42. In another example, it can be determined from the image captured by the provided image sensor that the operating member 40 and the adapting member 42 start to contact. In the example shown in FIG. 4, by way of example but not limitation, it can be considered that the operating member 40 starts to contact the adapting member 42 upon being placed on the plane 422. The assembling is completed when the operating member completely falls into the adapting part 420. In the present example, the preset assembling depth is the depth of the adapting member 420. Therefore, when the operating member 40 contacts the adapting member 42 and moves in the plane 422, the depth that the operating member 40 moves to the adapting member is unchanged. When the operating member 40 enters the adapting member 420 and reach the bottom of the adapting member 420, the depth of the operating member 40 moving to the adapting member 420 is equal to the preset assembling depth, and the preset condition is met.

In other cases, the preset assembling depth is a part of the depth of the adapting part 420. Accordingly, it is determined that the preset condition is satisfied upon the operating member 40 enters the adapting part 420 and moves a distance of said part of the depth of the adapting part 420.

There may exist other ways for assembling the operating member and the adapting member rather than entering the operating member into the adapting part as illustrated above, which cannot be exclusively explained herein. The conditions for indicating the completion of the assembling of the operating member and the adapting member can be the comparison of the assembling time with the preset maximum assembling time, or the comparison of the depth of the operating member moving into the adapting member with the preset assembling depth as described above. Besides, the completion of the assembling of the operating member and the adapting member can be determined from changing of the applied force. Still taking FIG. 4 as an example, if the force applied to the operating member 40 by the plane 422 suddenly changes, for example, suddenly decreases to 0 (i.e., the operating member 40 falls into the adapting part 420), and then suddenly increases in a short time (i.e., the operating member 40 lowers to the bottom of the adapting part 420), it indicates that the operating member 40 has been installed into the adapting part 420 and the assembling has been finished.

The detection of whether the preset condition is satisfied or not can be determined by images captured by the image capturing component, or by the information obtained by the force and torque sensor or the position sensor.

Figure 3:
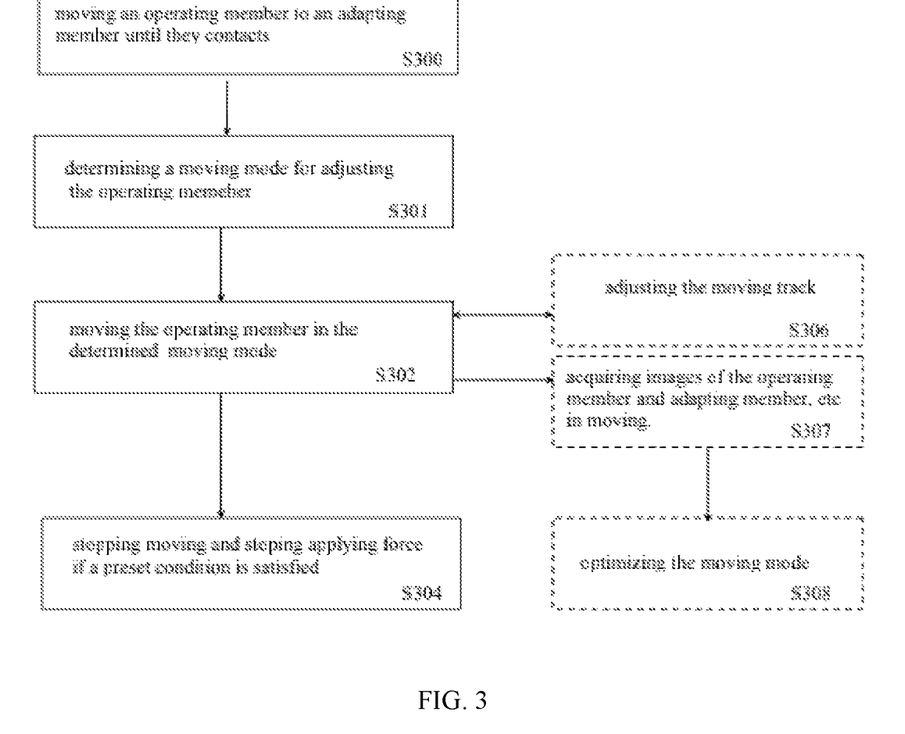
FIG. 3 is a flowchart of a method for assembling a workpiece by a robot according to an example of the present disclosure.

FIG. 3 is a flowchart of a method for assembling a workpiece by a robot according to an example of the present disclosure. As an example, the method can be implemented, by the robot as discussed above in combination with FIGS. 1 and 2.

Figure 5:
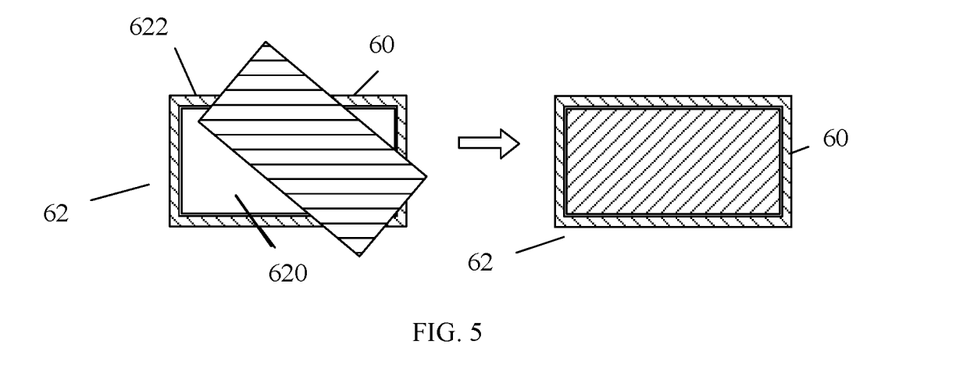
FIG. 5 schematically shows another assembling scenario according to another example of the present disclosure.

Referring to FIG. 3, at step S300, an operating member is moved to an adapting member in an assembly direction until the operating member reaches the adapting member, where the assembly direction is a direction which allows the operating member and the adapting member to be engaged. For example, the operating member can be operated by a robot through its operating tool 207 which moves the operating member to the adapting member in the assembly direction. For example, in FIG. 4, the assembly direction is the direction in which the operating member 40 enters into and moves to the bottom of the adapting portion 420 of the adapting member 42, that is, the negative z direction shown in FIG. 4. In FIG. 5, the assembly direction is the direction in which the operating member 60 is engaged to the adapting member 62 along the depth direction of the adapting part 620 of the adapting member 62.

At step S301, a moving mode for adjusting the operating member is determined. The moving mode can include a moving-in-plane mode, in which the operating member moves in a plane perpendicular to the assembly direction, a posture-adjusting mode in which the operating member is adjusted around the assembly direction, and both of them.

At step S302, the operating member is moved in the determined moving mode, where a force in the assembly direction is continuously applied to the operating member during the movement of the operating member in the determined moving mode. For example, the operating tool 207 of the robot can continuously apply force to the operating member during the whole moving process of moving the operating member in the determined moving mode.

At step 304, it is determined whether a preset condition for completion the assembling of the operating member and the adapting member is satisfied. If the preset condition is satisfied, the movement of the operating member in the moving mode may be stopped and the force along the assembly direction to the operating member may be stopped to apply. The controller of the robot can be used to determine whether the preset condition is satisfied, and generate, if the preset condition is satisfied, a control signal to make the operating tool stop moving the operating member in the moving mode and stop applying force to the operating member in the assembly direction.

Referring to FIG. 3. According to some examples of the present disclosure, the method for assembling the operating member and the adapting member by a robot further includes steps S306, S307 and S308. To indicate that steps S306, S307, and S308 are optional steps, they are shown in FIG. 3 with dashed boxes.

At step S306, during the movement of the operating member in the determined moving mode, when the robot detects an obstacle or finds that the operating member deviates from the adapting member, it adjusts the moving track to make the operating member bypass the obstacle or move towards the adapting member. Obstacles can be found, for example, by force and torque sensors provided on the robot body or by image capturing component.

At step S307, the relative position, posture information and other necessary information about the operating member and the adapting member are collected by the visual detection of the robot during the movement of the operating member in the determined moving mode. For example, such information can be collected by an image capturing component which is used as the visual detection of the robot. Instead of or as a supplement of the image capturing component, sensors such as position sensors, force and torque sensors and the like can also be used to collect related information. The collected information can be transmitted to the controller of the robot, for example.

At step S308, for example, the controller of the robot optimizes the moving mode according to the collected relative position and posture information about the operating member and the adapting member. By doing so, the optimized moving mode will be used in such assembling scenario in the future, and thereby optimizing the whole assembly strategy.

In the example, the optimizing at step S308 is based on the data collected at step S307, but in actual operation, the moving path can be optimized according to the obstacle information detected at step S306.

As an example, the method shown in FIG. 3 can be performed by the robot shown above in combination with FIGS. 1 and 2. Actually, the execution process of the method for assembling the operating member and the adapting member by the robot according to the examples of the present disclosure has been described above with reference to FIG. 1 and FIG. 2. Hereinafter, the process of executing the method shown in FIG. 3 by the robot will be further explained with reference to the assembly example shown in FIG. 5.

Referring to FIGS. 1, 2, 3 and 5, the robot is started to assemble the operating member 60 and the adapting member 62. The processor 222 of the controller 22 determines the moving mode for adjusting the operating member 60. In the example, the processor 222 determines the moving mode from the information transmitted from the vision system 24. Specifically, the camera 240 of the vision system 24 captures images of the operating member 60 and the adapting member 62. The information determined by the algorithm module 242 is transmitted to the processor 222. The processor 222 calculates and determines to adjust the posture of the operating member 60 around the assembly direction (i.e., adjust the position of the operating member 60 relative to the adapting member 62) and generates a control signal based on the current relative position of the operating member 60 to the adapting member 62. In the example, the assembly direction is perpendicular to the plane 622. The determined posture-adjusting mode includes the path information for adjusting the posture. The robot body 20 receives the control signal and operates the operation tool 207 accordingly. The operating tool 207 holding the operating member 20 adjusts the operating member 60 according to the path information for posture adjustment. Specifically, the operating tool 207 toggles the operating member 60 on the plane 622 to adjust its relative position with the adapting member 62, and finally makes the operating member 60 enter into the adapting part 620 of the adapting member 62. And the assembling is completed when the depth of the operating member 60 entering into the adapting part 620 of the adapting member 62 is greater than the preset assembling depth, as shown in the figure on the right side of FIG. 5.

It should be understood that FIG. 5 illustrates a specific situation in the posture-adjusting mode, and the posture of adjusting can have more forms. In some cases, it may be necessary to swing the operating member. For example, in the example shown in FIG. 4, the operating member can be controlled to swing in a plane perpendicular to the XY plane (for example, swing left and right in the XZ plane). In addition, in the examples of the present disclosure, the adjustment of the operating member is taken as an example. However, instead of or as a supplement of the adjustment of the operating member, the adjustment can be done to the adapting member so as to make its posture fit to the operating member.

Figure 6A:
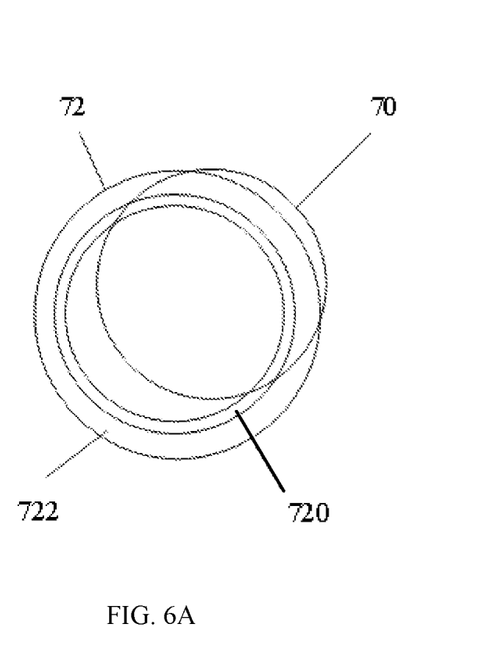
FIG. 6A shows the scenario before the assembling and FIG. 6B shows the scenario after the assembling.
Figure 6B:
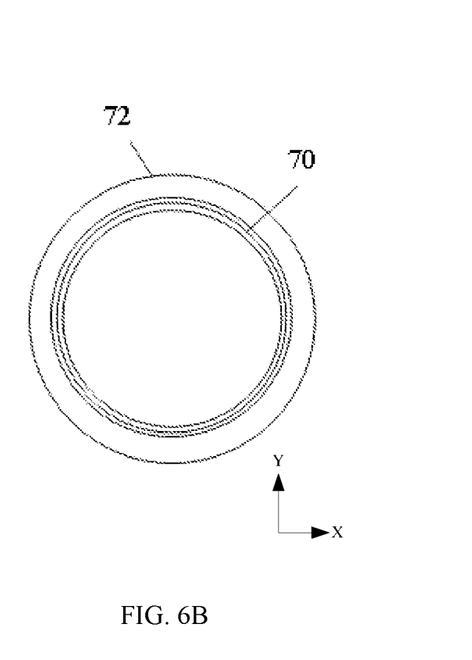

FIGS. 6A to 6B are exemplary assembling scenarios where an operating member 70 (a voice coil) needs to be fit into an adapting member 72 (a voice device). FIG. 6A shows the scenario before assembling, and FIG. 6B is the scenario after assembling is done according to the present disclosure.

Figure 7:
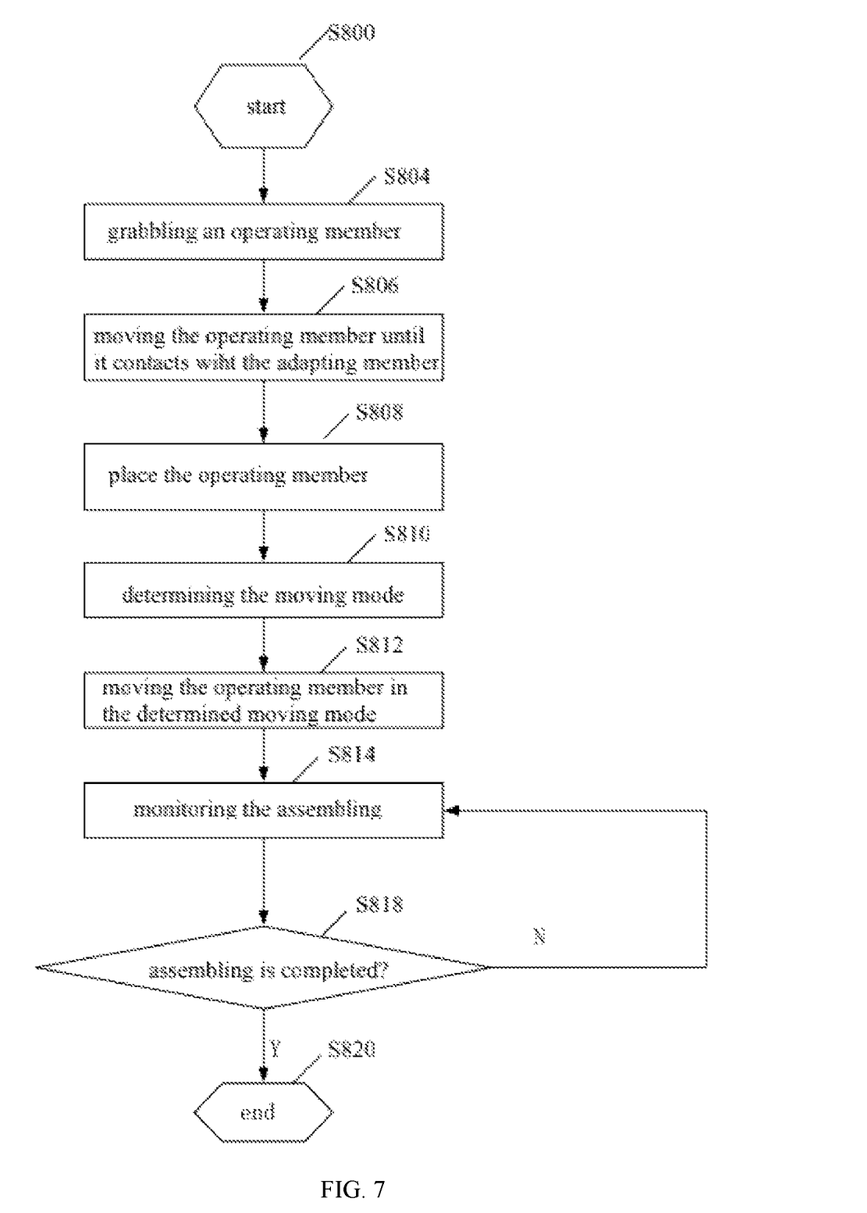
FIG. 7 is a flowchart of an exemplary process for assembling an operating member and an adapting member by a robot according to an example of the present disclosure.

FIG. 7 is a flowchart of an exemplary process for assembling an operating member and an adapting member by a robot according to an example of the present disclosure. Now, the process of the operating member being assembled to the adapting member will be discussed by taking the process shown in FIG. 7 implemented in the assembling scenario shown in FIGS. 6A and 6B as an example. Hereinafter in combination with FIGS. 7, 6A and 6B, the operating member 70 is also called a voice coil 70, and the adapting member 72 is also called an audio device 72, depending on the context.

As shown in FIG. 7, at step S800, the execution of the method is started. At step S804, the operating member is grasped. Herein, the term "grasp", "grasping" should be broadly understood to cover any operation such as clamping, sucking through a vacuum suction pipe, holding, or contacting which can be used to push the operating member. Grasping means that the operating tool of the robot operates the operating member 70 and moves it to the vicinity of the adapting member 72, for example, at least to the plane 722. Returning to the example of the assembling scenario of the voice coil and the audio equipment shown in FIGS. 6A and 6B, the operating tool of the robot grasps the voice coil 70 and moves it to the plane 722 of the audio device 72.

At step S806, the operating member is moved to the vicinity of the adapting member. The vicinity of the adapting member means that the operating member can at least contact the adapting member when the grasped operating member is put down. For example, the voice coil 70 is moved to the vicinity of the audio device 72 to ensure that the voice coil 70 can be placed on the plane 722 once it is put down.

At step S808, the controller of the robot controls the operating tool to place the operating member on the adapting member. For example, the voice coil 70 is placed on the plane 722.

At step S810, the moving mode of the operating member is determined. Returning to the example of the voice coil and the audio device, the controller determines what kind of moving mode will be selected to move the voice coil 70 enters the adapting part 720 of the audio device. The moving mode is either a moving-in-plane mode in which the operating member 70 is moved in the plane 722, or a posture-adjusting mode in which the operating member 70 is rotated around the assembly direction to engage with the adapting part 720, or a combination of the two modes. In the example combining FIGS. 6A and 6B, the assembly direction is perpendicular to the XY plane.

At step S812, the operating tool is controlled to move the operating member in the determined moving mode. In the example, the voice coil 70 is moved by the operating tool in the determined moving mode so as to enter the adapting part 720. During the movement of the operating member, a force is applied to the voice coil 70 in the assembly direction, that is, in the depth direction of the adapting part 720 such that a certain contact force exists between the voice coil 70 and the plane 722.

Figure 6C:
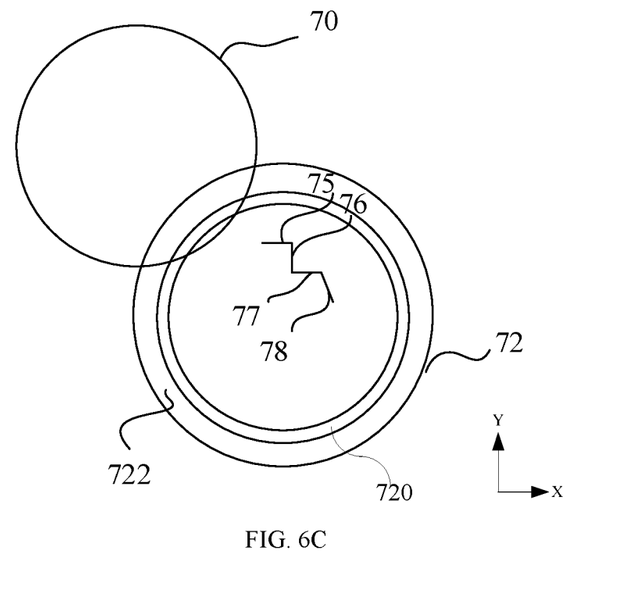
FIG. 6C shows an example of a grid path when the operating member 70 is moved in the plane 722 in grid path.

According to the example of the present disclosure, the moving-in-plane mode includes moving in a plane perpendicular to the assembly direction according to a preset track. The preset track has been described above, but it should be noted that the preset track may include more kinds of moving tracks, which cannot be exclusively explained herein. Under the condition that the assembling scenario is determined, it can be set in advance in which path or track the operating member moves into the fitting part of the fitting member. Taking the assembling scenarios shown in FIGS. 6A and 6B as examples, the preset track can be, for example, moving in a grid path in the plane 722 or moving back and forth. FIG. 6C shows an exemplary grid path when the voice coil 70 is moved along the grid path in the plane 722. As shown, the operating member 70 moves forward in the direction 75, after moving for a certain distance, it is adjusted to move in the direction 76, then adjusted to move in the direction 77, and then move in the direction 78. In the grid path movement, the moving distances in different directions are unnecessarily fixed or are unnecessarily kept as same. Besides, in the grid path movement, the directions are unnecessarily orthogonal to each other. The grid path is intended to enable the operating member 70 to be adjusted due to the direction deviation during the movement to the adapting member 72. As a supplement or alternative to the grid path, the moving path can also be zigzag or S-shaped moving to a certain place.

Figure 6D:
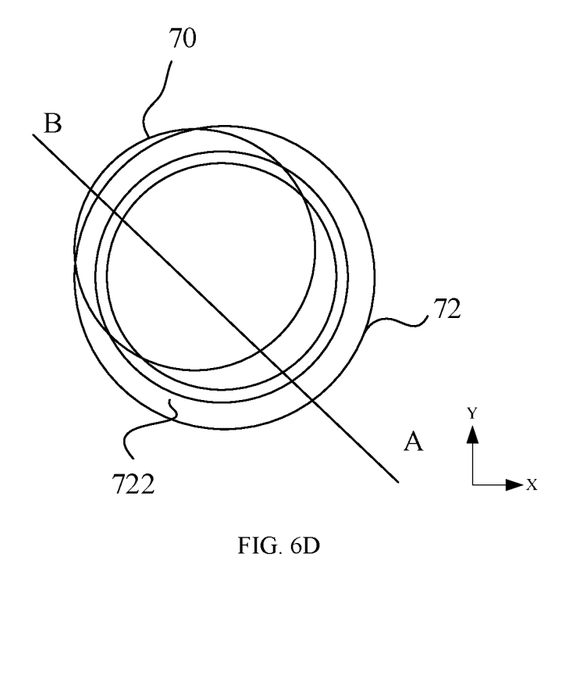
FIG. 6D shows a way of moving the operating member 70 in a straight line back and forth in the plane 722.

FIG. 6D shows the moving track of the operating member 70 moving back and forth in a straight line on the plane 722. As shown in the figure, the operating member 70 is adjusted along the straight line AB in the direction B, and then in the direction A. The purpose of adjustment is to make the operating member 70 fall into the adapting part 720. The distance for each adjusting can be different or the same, which is determined by the controller of the robot according to the positional relationship between the operating member and the adapting member acquired by the image device or the position sensor, or by the force information sensed by the force and torque sensors. Although track in a curve is not shown in figures, it should be understood that in some examples, the line AB can be a curve.

Turning to the examples shown in FIG. 6A and FIG. 6B, where the determined moving mode is a moving-in-plane mode. Specifically, the moving mode here can be moving forward in a straight way, moving in a grid path, moving back and forth along a straight line, or any combination thereof.

At step S814, the process in which the operating tool 207 moves the operating member to the adapting member in the determined moving mode is monitored, so as to determine whether there is abnormality in the moving path of the operating member. Abnormality here refers to the situation that the operating member may encounter in moving to the adapting member the situation out of the normal moving environment, such as being blocked by obstacles.

When the voice coil 70 is moved by the operating tool of the robot, the controller of the robot determines whether the moving path is correctly towards the audio device 72 according to the information acquired by the image capturing component, etc. If there is any deviation, the controller controls the operating tool to make adjustment, and the adjusted path can be, for example, the various moving paths in the plane mentioned above.

In the monitoring described at step S814, the robot can also monitor the assembling time from the beginning. In this case, the maximum time for assembling, namely Tmax, is usually preset. If the assembly scenario is known, the preset maximum assembling time can be determined in advance. In addition, it can also be determined according to prior experience.

As shown at step S818, if the assembling time Tmount>Tmax, the assembling is completed, and the process proceeds to step S820 at which the current assembling is ended. Otherwise, the assembling time will still be monitored at step S814.

It is possible to determine whether the assembling is completed in other ways, for example, according to the depth of movement of the voice coil 70 to the audio device 72.

Figure 8:
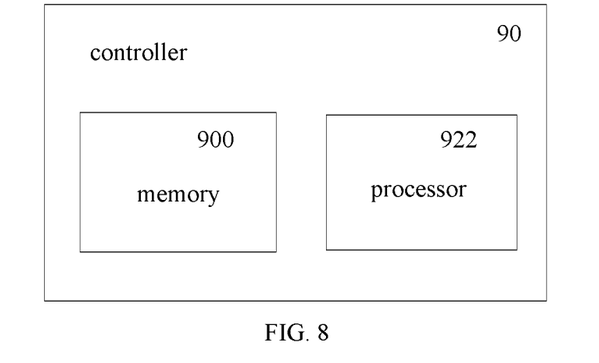
FIG. 8 is a block diagram of a controller according to an example of the present disclosure.

The disclosure also provides a controller 90 shown in FIG. 8. The controller 90 includes a memory 900 and a processor 922. The memory 900 is used for storing instructions, and the processor 922 is configured to execute these instructions. As an example, the controller 90 can communicatively coupled to the robot shown in FIG. 1. According to a particular example, the controller 90 can be implemented as the controller 20 described above in connection with FIG. 2. The controller 90 can be applied to the robot shown in FIG. 1 in the same way as the controller 20. In other words, the controller 20 can be implemented as a separate controller 90 and communicatively coupled to the robot to realize functions described above.

Several examples of the application have been described with reference to the drawings above. According to examples of the present disclosure, when assembling a workpiece, the robot moves the workpiece in the moving mode determined based on the assembly environment. And in the process of moving, the moving mode or moving track of the operating member can be adjusted due to obstacles, deviation from the direction, etc., so as to achieve flexibly assembling like human assembling the workpieces.

The embodiments as described above only illustrate several embodiments of the present disclosure, and their descriptions are more specific and detailed, but they should not be construed as limiting the scope of the invention patent. It should be noted that, for those of ordinary skill in the art, without departing from the concept of the present disclosure, several variants and modifications can be made, which all fall within the protection scope of the present disclosure. Therefore, the protection scope of the invention patent shall be subject to the appended claims.

What is claimed:

1. A method for assembling an operating member and an adapting member by a robot, wherein the method comprises:
    moving the operating member towards the adapting member in an assembly direction until the operating member reaches the adapting member, wherein the assembly direction is a direction which allows the operating member and the adapting member to be engaged;
    determining a moving mode for adjusting the operating member, the moving mode comprising one or both of a moving-in-plane mode, in which the operating member is moved in a plane perpendicular to the assembly direction, and a posture-adjusting mode, in which the operating member is adjusted around the assembly direction;
    moving the operating member in the determined moving mode, and applying a force continuously to the operating member in the assembly direction during moving the operating member in the determined moving mode; and
    determining whether a preset condition for a completion of the assembling of the operating member and the adapting member is satisfied, and stopping moving the operating member in the determined moving mode as well as stopping applying the force to the operating member in the assembly direction when it is determined that the preset condition is satisfied,
    wherein the moving-in-plane mode comprises moving in a preset track in the plane perpendicular to the assembly direction, the preset track comprising any one of the followings or combination thereof:
        a track of one way or back and forth movement along a straight line;
        a track of one way or back and forth movement along a curve;
        a track of one way or back and forth movement in a grid path; and
        a track of one way or back and forth movement spirally.

2. The method of claim 1, wherein the determining a moving mode for adjusting the operating member comprises:
    determining an assembly environment for the operating member and the adapting member, wherein the assembly environment is related to at least one of positions of the operating member and the adapting member and ways of the assembling of the operating member and the adapting member; and
    determining the moving mode for the operating member based on the assembly environment.

3. The method of claim 1, wherein the method further comprises:
    a plurality of presetting possible moving modes; and
    wherein the determining a moving mode for adjusting the operating member comprises selecting the moving mode for adjusting the operating member from the plurality of the preset possible moving modes.

4. The method of claim 1, wherein the moving the operating member in the determined moving mode comprises:
    acquiring information on positions of the operating and adapting members and posture information of at least the operating member by robot visual detection during moving the operating member in the determined moving mode; and
    optimizing the moving mode based on the acquired information on positions of the operated and adapting members and the acquired posture information of at least the operating member.

5. The method of claim 1, wherein the preset condition comprises:
    a time for assembling being greater than a preset maximum assembling time, or
    a depth that the operating member moves to the adapting member starting from the moment of the operating member just reaching the adapting member being greater than a preset assembling depth.

6. The method of claim 1, wherein the applying a force continuously to the operating member in the assembly direction during moving the operating member in the determined moving mode comprises:
    applying a constant force to the operating member continuously in the assembly direction;

applying a first force to the operating member continuously in the assembly direction, wherein the first force is increased gradually; or applying a second force to the operating member continuously in the assembly direction, wherein the second force is decreased gradually.

7. A robot comprising:

several connecting rods;

joint drivers provided at connections of the connecting rods;

an end effector provided at the end of the connecting rods; and an operating tool provided at the end effector, and the operating tool being configured to:

move an operating member towards an adapting member in an assembly direction until the operating member which allows the operating member and the adapting member to be engaged;

move the operating member in a determined moving mode, wherein a force is continuously applied to the operating member in the assembly direction during moving the operating member in the determined moving mode; and stop moving the operating member in the determined moving mode and stop applying the force to the operating member in the assembly direction, if a preset condition for a completion of the assembling of the operating member and the adapting member is satisfied, a processor and a memory for storing instructions, in which when executing the instructions, the processor is configured to:

determine the moving mode for adjusting the operating member, the moving mode comprising one or both of a moving-in-plane mode, in which the operating member is moved in a plane perpendicular to the assembly direction, and a posture-adjusting mode, in which the operating member is adjusted around the assembly direction; and generate a control signal from the determined moving mode to control the operating tool, which comprises generating the control signal from a preset track, the preset track comprising one or any combination of:

a track of one way or back and forth movement along a straight line;

a track of one way or back and forth movement along a curve;

a track of one way or back and forth movement in a grid path; and a track of one way or back and forth movement spirally.

8. The robot of claim 7, wherein the robot further comprises:

an image capturing component used for capturing images for the operating member and the adapting member to determine an assembly environment for the operating member and the adapting member, wherein the assembly environment is related to at least one of positions of the operating member and the adapting member and ways of assembling of the operating member and the adapting member; and the processor further configured to determine the moving mode for the operating member based on the assembly environment.

9. The robot of claim 7, wherein the memory is further used to store a plurality of preset possible moving modes, and the processor is further configured to select the moving mode for adjusting the operating member from the plurality of the preset possible moving modes when executing the instructions.

10. The robot of claim 8, wherein the image capturing component is configured to acquire information on positions of the operating and adapting members and posture information of at least the operating member during moving the operating member in the determined moving mode.

11. The robot of claim 10, wherein the processor is configured to optimize the moving mode based on the acquired information on positions of the operated and adapting members and the acquired posture information of at least the operating member.

12. The robot of claim 7, wherein the operating tool is configured to stop moving the operating member in the determined moving mode and stop applying the force to the operating member in the assembly direction, if a time for assembling is greater than a preset maximum assembling time or if a depth that the operating member moves to the adapting member starting from the moment of the operating member just reaching the adapting member is greater than a preset assembling depth.

13. A controller comprising a processor and a memory for storing instructions, wherein when executing the instructions, the processor is configured to:

control a robot to move an operating member to an adapting member in an assembly direction until the operating member reaches the adapting member, wherein the assembly direction is a direction which allows the operating member and the adapting member to be engaged;

determine a moving mode for adjusting the operating member, the moving mode comprising one or both of a moving-in-plane mode, in which the operating member is moved in a plane perpendicular to the assembly direction, and a posture-adjusting mode, in which the operating member is adjusted around the assembly direction;

control the robot to move the operating member in the determined moving mode, wherein the robot is controlled to apply a force to the operating member in the assembly direction during moving the operating member in the determined moving mode; and determine whether a preset condition for a completion of the assembling of the operating member and the adapting member is satisfied, and stop moving the operating member in the determined moving mode and stop applying the force to the operating member in the assembly direction when it is determined that the preset condition is satisfied, wherein when executing the instructions, the processor being configured to control the robot to move the operating member in the determined moving mode further comprises controlling the robot to move the operating member according to a preset track, in which the preset track comprises one or any combination of:

a track of one way or back and forth movement along a straight line;

a track of one way or back and forth movement along a curve;

a track of one way or back and forth movement in a grid path; and a track of one way or back and forth movement spirally.

14. The controller of claim 13, wherein the processor is configured to determine whether the preset condition is satisfied from one or both of followings:

a time for assembling being greater than a preset assembling maximum time;
a depth that the operating member moves to the adapting member starting from the moment of the operating member just reaching the adapting member being greater than a preset assembling depth.

* * * * *